(12) United States Patent
Fowell

(10) Patent No.: US 6,921,049 B2
(45) Date of Patent: Jul. 26, 2005

(54) SYSTEM FOR COUNTERACTING A DISTURBANCE IN A SPACECRAFT

(75) Inventor: Richard A. Fowell, Rolling Hills Estates, CA (US)

(73) Assignee: The Boeing Company, Chicago, IL (US)

( * ) Notice: Subject to any disclaimer, the term of this patent is extended or adjusted under 35 U.S.C. 154(b) by 66 days.

(21) Appl. No.: 10/707,049

(22) Filed: Nov. 18, 2003

(65) Prior Publication Data

US 2005/0116111 A1 Jun. 2, 2005

(51) Int. Cl.[7] .............................................. B64G 1/24
(52) U.S. Cl. ....................... 244/164; 244/169; 244/171; 701/13
(58) Field of Search .......................... 244/158 R, 164, 244/165, 169, 171; 701/13

(56) References Cited

U.S. PATENT DOCUMENTS

| | | |
|---|---|---|
| 5,222,023 A | 6/1993 | Liu et al. |
| 5,349,532 A | 9/1994 | Tilley et al. |
| 5,459,669 A | 10/1995 | Adsit et al. |
| 5,517,418 A * | 5/1996 | Green et al. .................. 701/13 |
| 5,610,820 A | 3/1997 | Shankar et al. |
| 6,340,138 B1 | 1/2002 | Barsky et al. |
| 6,622,969 B2 * | 9/2003 | Yamashita ................... 244/165 |
| 2002/0125374 A1 * | 9/2002 | Anzel .......................... 244/169 |
| 2003/0010871 A1 * | 1/2003 | Wang et al. ................. 244/173 |
| 2004/0069905 A1 * | 4/2004 | Goodzeit et al. ........... 244/169 |

OTHER PUBLICATIONS

Banerjee, Arun K., Pedreiro, Nelson, Singhose, William E.; "Vibration Reduction for Flexible Spacecraft Following Momentum Dumping With/Without Slewing"; Journal of Guidance, Control and Dynamics, vol. 24, No. 3, May-Jun. 2001.

* cited by examiner

Primary Examiner—J. Woodrow Eldred
(74) Attorney, Agent, or Firm—Kevin G. Mierzwa

(57) ABSTRACT

A system for counteracting a disturbance in a spacecraft includes a biasing apparatus that is coupled to the spacecraft and a spacecraft controller within the spacecraft. The disturbance has a known sign, magnitude and time. The biasing apparatus controls the biasing apparatus to place the spacecraft in a first dynamic state or position as a function of the sign, magnitude, and time of the disturbance. The controller also controls the spacecraft to a second dynamic state as a function of the known sign, magnitude, and time so that the spacecraft is oriented in a position other than the desired orientation so that after the disturbance the spacecraft is oriented in the desired orientation in response to the disturbance. The biasing apparatus may comprise a momentum wheel and the disturbance may comprise thrusting firing used for controlling momentum dumping.

33 Claims, 3 Drawing Sheets

SYSTEM FOR COUNTERACTING A DISTURBANCE IN A SPACECRAFT

BACKGROUND OF INVENTION

The present invention relates generally to attitude control systems for a spacecraft, and more particularly, to a method and apparatus for counteracting a disturbance in a spacecraft.

As a spacecraft orbits the earth, the position of the spacecraft relative to the earth must be periodically corrected by firing thrusters to maintain the spacecraft in the desired orbit. During an orbit correction, the spacecraft's attitude must be maintained in the desired direction. Oftentimes a reaction wheel system or gimbaled momentum wheel is used to provide the desired torque to maintain the spacecraft's attitude. As a result of opposing disturbing torques, for example solar radiation pressure, the momentum builds up within the momentum wheel making it necessary to dump momentum before the momentum wheel reaches its maximum speed. This is commonly done by firing spacecraft on-off thrusters.

The use of thrusters for momentum dumping uses valuable propellant. Satellite life and hence satellite revenue is often propellant limited. Thus, the propellant consumed for thruster momentum dumping reduces potential revenue.

It is known that thruster efficiencies increase with the average duration of thruster pulses. Thus, the longer the burn times of the thruster, the higher the efficiency of the burn process. This utility has motivated many prior art methods for increasing the size of thruster pulses used for momentum dumping while keeping the amplitude of the resulting attitude transient below a given bound.

The prior art is described for an idealized momentum dumping example. A roll thruster angular momentum impulse unloads a roll wheel which has 0.15 N-m of available torque. The satellite roll inertia is 1000 kg-m^2. The allowable thruster impulse is that such that the angular excursion from the nominal is no more than 1 milliradian. All quantities are perfectly known.

In the following, "one-sided transients" denote those where the roll errors are predominantly of one sign, and "two-sided transients" denote those where significant roll errors of both signs are seen.

In a first prior art method, closed loop feedback of roll attitude error to roll wheel torque is used. After the roll thruster impulse, an opposing wheel torque develops, eventually slowing the spacecraft down and returning it to its nominal attitude. The resultant excursion is predominantly one-sided, in the direction produced by the thruster impulse. This method does not rely on a priori knowledge of the sign, timing or magnitude of the thruster impulse. The allowable thruster impulse here is determined by how quickly and forcefully the control system responds. The allowable thruster impulse is less than 0.55 N-m-s.

In a second prior art method, feedforward is used. At the application of the roll thruster impulse, an opposing full torque roll wheel command is applied simultaneously. The duration of the wheel torque command is set so the total wheel momentum impulse is equal and opposite that of the thruster impulse. At the end of the impulse, the attitude is offset, but can be returned to nominal by means such as closed loop wheel control. The resultant excursion is predominantly one-sided, in the direction produced by the thruster impulse. This method relies on a prior knowledge of the sign, timing and magnitude of the thruster impulse. The allowable thruster impulse is 0.55 N-m-s.

In a third prior art method, prebias is used. The spacecraft is biased in roll angle, approximately 50% of the magnitude, in the opposite direction of the expected transient. At the end of the impulse, the attitude is offset, but can be returned to nominal by means such as closed loop wheel control. Wheel control may be by the first or second prior art method, or a combination. The resultant excursion is two-sided. This method relies on a priori knowledge of at least the sign of the thruster impulse. The allowable thruster impulse is 0.77 N-m-s for the feedforward variant.

In a fourth prior art method, pre-emphasis torque is used. This is an anticipatory feedforward technique. An open loop wheel torque pulse is initiated in advance of the thruster pulse, such that the thruster pulse will be centered on the wheel torque pulse, and the total wheel momentum impulse is equal and opposite that of the thruster impulse. The resultant excursion is predominantly one-sided, in the direction produced by the thruster impulse. The nominal attitude is reached at the end of the wheel torque pulse. This method relies on a priori knowledge of the sign, timing and magnitude of the thruster impulse. The allowable thruster impulse is 1.10 N-m-s.

A fifth prior art method follows that of the fourth prior art method, except that the timing is chosen so that the thruster impulse occurs at a time which is $(\sqrt{2}-1)= 41.4\%$ of the way through the wheel torque pulse, rather than 50% in the fourth prior art method. The resultant excursion is two-sided, with equal amplitude error on both sides. At the end of the impulse, the attitude is offset, but can be returned to nominal by closed loop wheel control or equivalent means. This method relies on a priori knowledge of the sign, timing and magnitude of the thruster impulse. The allowable thruster impulse is 1.32 N-m-s.

A sixth prior art method is described in U.S. Pat. No. 6,439,509. The system provides a method for manipulating the states of the spacecraft's nutation compensator. The system is used to reset one of the states in the nutation compensator polynomial to a value in proportion to the magnitude of the expected roll momentum unload so as to develop a short term transient that is equal and opposite to that of the roll unload. Thus, the compensator will automatically damp out the roll unload transient without biasing the spacecraft in roll. The timing can be critical and is best found by empirical means, or heuristically. Since this method is explicitly presented as a replacement for the third prior art method, the transient is predominantly one-sided. The allowable thruster impulse will be a function of the polynomial used, but should be less than 1.10 N-m-s, since that is the best of the other one-sided methods.

SUMMARY OF INVENTION

The present invention provides a method for dumping momentum in a spacecraft that increases the burn time of the thrusters and reduces the number of times the thrusters are fired to increase the overall efficiency of the process. The process is thus more fuel efficient and the spacecraft life is therefore increased.

As an example, in one embodiment, an allowable thruster impulse of 1.55 N-m-s can be accomplished for the idealized momentum dumping example above. To do so, the attitude is initially pre-biased as in the third prior art method, but in the opposite direction, and to a level equal to the allowable angular excursion. Then the full available wheel torque in the direction opposite to the roll thruster impulse. When the roll angle approaches the allowable angular excursion on the other side, the thruster impulse is initiated based on timing, attitude knowledge, or other means. The wheel torque continues until the full thruster impulse has been unloaded. At this point, like the second, third and fifth, but unlike the fourth, prior art method, the attitude is not the nominal attitude. At this point, the satellite attitude can be returned to nominal if desired. This embodiment creates a two-sided transient.

The principles taught herein need not be limited to thruster momentum dumping. The principles may be applied to any transient induced mismatch disturbances. In one aspect of the invention a system for counteracting a disturbance in the spacecraft having a known sign includes a pre-biasing apparatus coupled to the spacecraft and a spacecraft controller within the spacecraft and coupled to the pre-biasing apparatus. The spacecraft controller prior to this disturbance controls the pre-biasing apparatus to a first dynamic state as a function of the known sign magnitude and time and also prior to the disturbance controls the pre-biasing apparatus to a second dynamic state as a function of the known sign, magnitude and time so that the spacecraft is oriented in a position other than a desired orientation so that after the disturbance the spacecraft is oriented in the desired orientation in response to the disturbance.

In a further aspect of the invention, a method of counteracting a disturbance in a spacecraft having a known sign, magnitude and time includes prior to the disturbance initiating a first dynamic state of a spacecraft as a function of the known sign magnitude and time, prior to the disturbance initiating a second dynamic state of the spacecraft as a function of the known sign, magnitude and time and orienting the spacecraft in a desired position in response to the disturbance. In a further aspect of the invention, a method of dumping momentum in a spacecraft having a known sign, magnitude and time includes prior to the disturbance, initiating a first dynamic state of the spacecraft as a function of the known sign, magnitude and time, prior to the disturbance, initiating a second dynamic state of the spacecraft as a function of the known sign, magnitude and time; and orienting the spacecraft in a desired position in response to the disturbance.

Other aspects and advantages of the present invention will become apparent upon the following detailed description and appended claims, and upon reference to the accompanying drawings.

DETAILED DESCRIPTION

Figure 1:
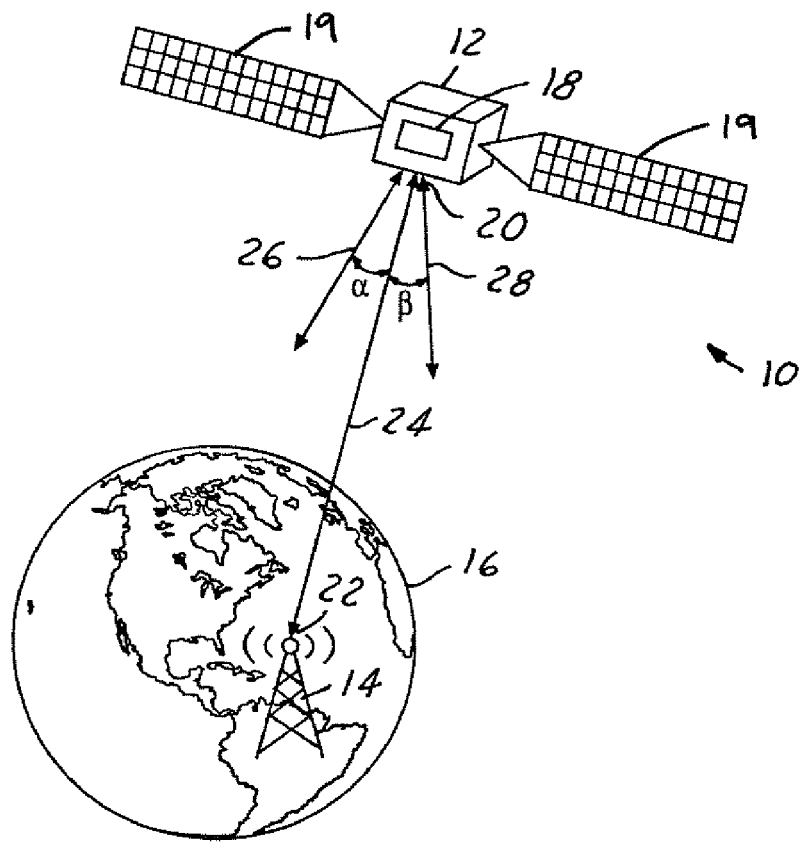
FIG. 1 is a high level diagrammatic view of a spacecraft relative to the earth having an attitude control system according to the present invention.

In the following figures the same reference numerals will be used to identify the same components.

The following description is provided with respect to a satellite in a satellite system. However, those skilled in the art will recognize that the present invention may be applied to various spacecraft.

Referring now to FIG. 1, a perspective view of a satellite system for momentum dumping in accordance with one embodiment of the present invention is illustrated. The satellite system 10 is comprised of one or more satellites 12 in communication with a ground station 14 located on the earth 16. Each satellite includes a control system 18 for adjusting the attitude and dumping momentum of the satellite 12 and a pair of solar arrays 19. The satellite 12 includes an antenna 20 for which it is desirable to be positioned toward an antenna 22 of ground station 14. Of course, those skilled in the art will recognize that ground station 14 may include various types of communication devices such as a network operation center or various mobile and stationary users. By properly positioning the spacecraft and thus the antenna 20 in a desired pointing direction 24, communications with the ground station 14 may be maintained. Two allowable pointing transient excursions are illustrated by an upper angle limit 26 and a lower angle limit 28. The angle that corresponds to the upper is α and the angle corresponding to the lower limit is β. The positioning of the satellite relative to these limits will be further described below. Many scientific and communications missions cannot be accurately fulfilled without consistently monitoring and controlling the satellite-three axis attitude. In many satellite applications a satellite must be positioned to direct communications signals in particular directions or to receive signals from specifically located sources. Without accurate control over the satellite-three axis attitude, transmission of such signals is hindered and at times impossible.

Figure 2:
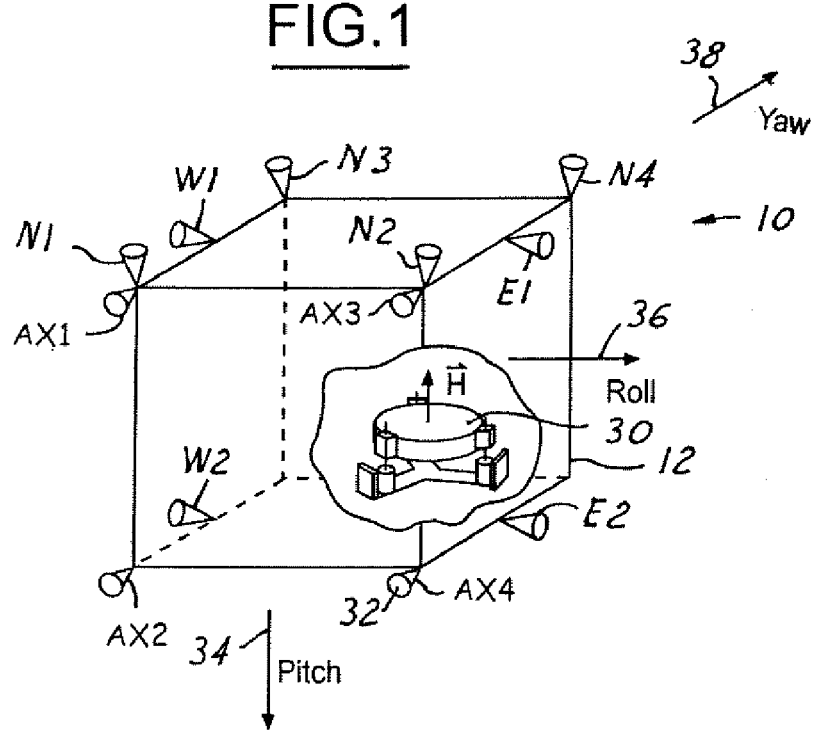
FIG. 2 is a perspective view of the satellite of the present invention.
Figure 3:
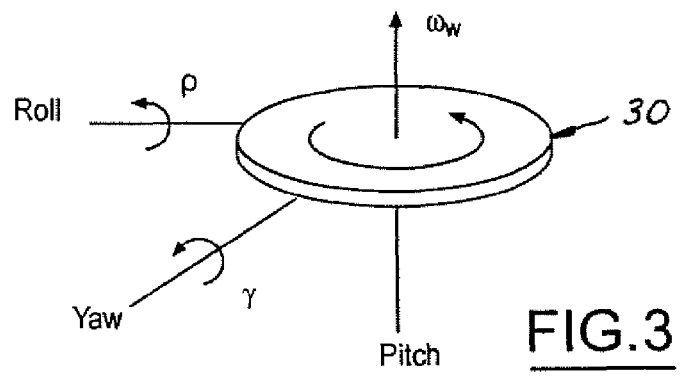
FIG. 3 is a perspective view of the momentum wheel illustrated in FIG. 2.

Referring now to FIGS. 2 and 3, satellite 12 is equipped with an attitude and orbit control device. The orbit of the spacecraft 12 is controlled using thrusters 32 while errors are measured relative to inertial space using gyroscopes as will be described below. Attitude is controlled using either a gimbaled momentum wheel 30 or thrusters 32. Alternatively, the spacecraft may use a reaction wheel system (not shown) in place of the gimbaled momentum wheel 30, a control momentum gyro, or multiple reaction wheel system. In general, any torque actuation system which has limited control authority and momentum storage capacity on at least one axis can be employed. In a normal mode the gimbal momentum wheel 30 controls the spacecraft attitude by changing the momentum of the spacecraft about its pitch axis 34, roll axis 36, and yaw axis 38. The amount of momentum on a given axis is controlled by changing the rotational speed $\omega_W$ and the gimbal angles $\Sigma$ and $\gamma$.

Thrusters N1-N4 are called north thrusters, thrusters AX1–AX4 are called axial thrusters, thrusters E1 and E2 are called east thrusters, and thrusters W1 and W2 are called west thrusters. Firing the north thrusters N1–N4 at ascending orbital nodes reduces orbital inclination. The north thrusters may also be used to apply roll and yaw torques to control the attitude of the spacecraft. The axial thrusters AX1–AX4 are used to control the pitch and the roll attitude of the spacecraft but do not contribute orbit inclination. East thrusters E1 and E2 correct for an east drift of the spacecraft and west thrusters W1 and W2.

Figure 4:
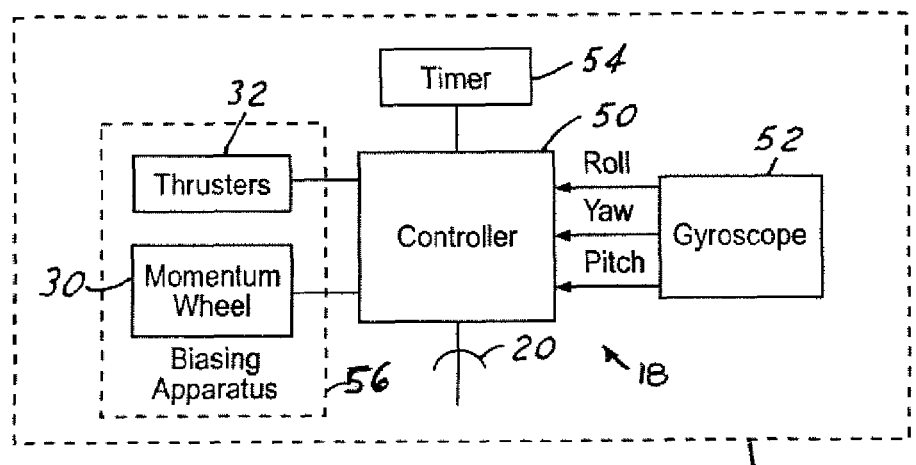
FIG. 4 is a simplified block diagrammatic view of the control system according to the present invention.

Referring now to FIG. 4, control system 18 is illustrated in further detail. Control system 18 has a spacecraft controller or controller 50 that is preferably microprocessor controlled. Spacecraft controller 50 is coupled to antenna 20 to control the transmission and reception of communication signals to the ground station. Controller 50 also includes a gyroscope or plurality of gyroscopes 52 that may be used to provide feedback to controller as to the roll, yaw, and pitch attitude and/or rates of the spacecraft 12. Gyroscope 52 may include an inertial measuring unit or several units. Controller 50 may also be coupled to timer 54 that is used to time various functions as will be described below. Various functions may be controlled with respect to the timer 54 or with respect to feedback from gyroscope 52 until a desired position is reached. Controller 50 is also coupled to a pre-biasing apparatus or biasing apparatus 56. The biasing apparatus may include the thrusters 32 described above and the momentum wheel 30. When the momentum wheel nears or reaches a maximum speed, the thrusters may be used to control the momentum dumping. The controller 50 may control the gimbals of the momentum wheel 30 and the thrusters 32 in desired directions. Based on feedback from the gyroscopes 52 and/or the timer 54, the controller may be desirably positioned.

Figure 6:
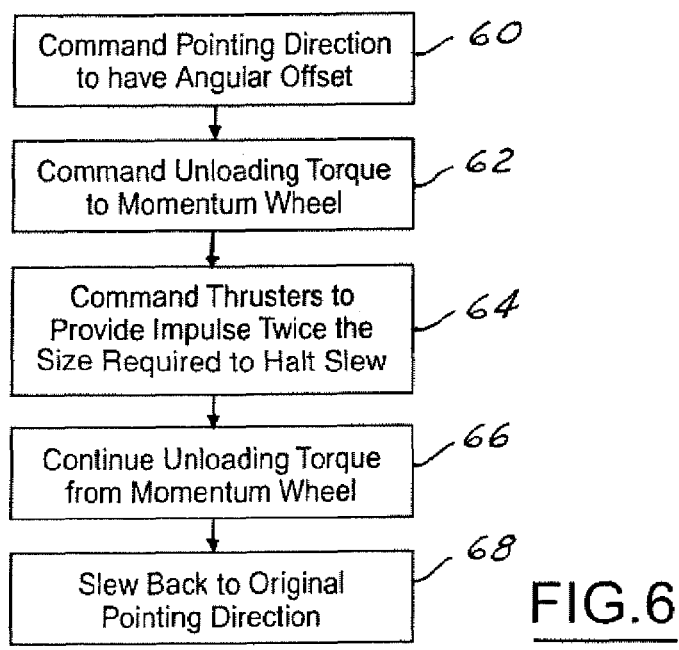
FIG. 6 is a flow chart of a method of operating the system.
Figure 5:
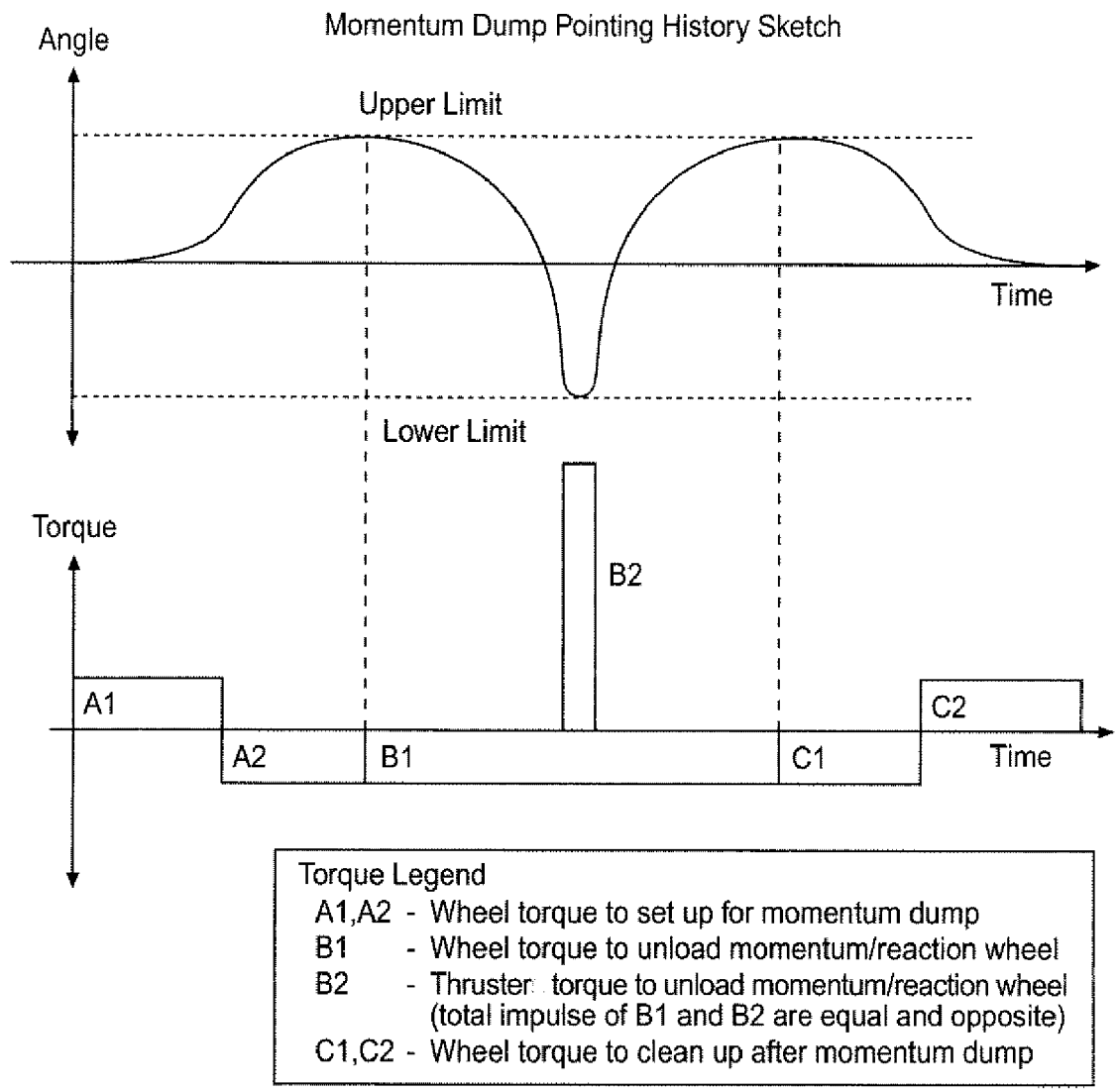
FIG. 5 is an angle versus time plot and a torque versus time plot of the momentum dumping method of the present invention.

Referring now to FIGS. 5 and 6, one embodiment for dumping momentum is described. In step 60, the pointing direction of the satellite is commanded to be changed from an ideal direction to a direction having an angular offset. In this embodiment the angular offset is equal to the allowable transient angular excursion. The direction of the angular offset is also opposite to the transient which will occur when the momentum wheel is torqued during the momentum unloading process. In FIG. 5 the torque provided by the momentum wheel to position the spacecraft for momentum dumping is shown as regions A1 and A2.

Note that at the time marked by the end of time segment B1 in FIG. 5, the spacecraft has same angular position and rate that it has at the start of time segment B1. Therefore, the events shown in FIG. 5 for time segment B1 can be repeated as many times as desired to handle multiple pulses before proceeding to the cleanup segments C1 and C2.

In step 62, the momentum unloading torque is commanded to the momentum wheels when the angular offset is reached. This is the beginning of B1 in FIG. 5. It should also be noted at this point the closed loop control in the particular axis is suspended. At this point the spacecraft will begin to slew to remove the initial angular offset and ultimately continue past the ideal direction to the opposite side.

In step 64, the thrusters are commanded to provide an impulse twice the size to halt the slew. This time may be at a precalculated time or may be provided based on the gyroscopic information. The timing is set such that the slewing is halted despite the full wheel torque at an offset equal to the allowable transient excursion in the opposite direction. In one embodiment the thruster firing is centered within the total time period of the whole operation. That is, centered between the sum of the time periods A1, A2, B1, C1, and C2. That is, in FIG. 5 the lower limit. This not only halts the slew but at the end of thruster firing the slew rate will have the same magnitude and opposite sign.

In step 66, the wheel continues at full or near full torque until the slew is halted. This may be performed at a precalculated time, by sensing the angular rate or other position using the gyroscope, or by other means. This point in time corresponds to the end of box B1 and the beginning of box C1 in FIG. 5. The spacecraft is pointed back at the upper limit or the initial angular offset between boxes A1 and B1.

In step 68, the spacecraft is slewed back to the ideal pointing direction. This is performed by using the wheel torque to "clean up" after the momentum has been dumped. The peak of the dumped momentum occurs at the boundary between box B1 and C1.

Note that at the time marked by the end of time segment B1 in FIG. 5, the spacecraft has same angular position and rate that it has at the start of time segment B1. Therefore, the events shown in FIG. 5 for time segment B1 can be repeated as many times as desired to handle multiple pulses before proceeding to the cleanup segments C1 and C2.

Some examples of transients induced by mismatched disturbances include deployment transients, release transients, latch up transients, liquid apogee motor turn on transients, solar array thermal snap transients, rendezvous docking transients, or the like.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A system for counteracting a disturbance in a spacecraft having a known sign, magnitude and time comprising:
    a biasing apparatus coupled to the spacecraft; and
    a spacecraft controller within the spacecraft, prior to the disturbance, said controller controlling the biasing apparatus to place the spacecraft in a first dynamic state as a function of the known sign, magnitude and time and controlling the biasing apparatus to place the spacecraft in a second dynamic state as a function of the known sign, magnitude and time so that the spacecraft is oriented in a position other than a desired orientation so that after the disturbance the spacecraft is oriented in the desired orientation in response to the disturbance.

2. A system as recited in claim 1 wherein the biasing apparatus comprises a momentum wheel.

3. A system as recited in claim 1 wherein the first dynamic state comprises an angular rate.

4. A system as recited in claim 1 wherein the second dynamic state comprises an angular position.

5. A system as recited in claim 1 wherein the first dynamic state comprises an angular rate and the second dynamic states comprises an angular position.

6. A system as recited in claim 1 wherein the disturbance comprises thruster momentum dumping.

7. A system as recited in claim 1 wherein said controller controls the biasing apparatus to move the spacecraft to the desired orientation after the disturbance.

8. A system as recited in claim 7 wherein the disturbance is centered between the controller controlling the biasing apparatus to a first dynamic state and controlling the biasing apparatus to a second dynamic state, and the controller controlling the biasing apparatus to move the spacecraft to the desired orientation after the disturbance.

9. A system as recited in claim 1 wherein the disturbance comprises deployment transients, release transients, latch up transients, liquid apogee motor turn on transients, solar array thermal snap transients or rendezvous docking transients.

10. A method of counteracting a disturbance in a spacecraft having a known sign, magnitude and time comprising:
    prior to the disturbance, initiating a first dynamic state of the spacecraft as a function of the known sign, magnitude and time;
    prior to the disturbance, initiating a second dynamic state of the spacecraft as a function of the known sign, magnitude and time; and
    orienting the spacecraft in a desired position in response to the disturbance.

11. A method as recited in claim 10 wherein the first dynamic state comprises an angular rate.

12. A method as recited in claim 10 wherein the first dynamic state comprises an angular position.

13. A method as recited in claim 10 wherein the disturbance comprises thruster firing.

14. A method as recited in claim 10 wherein the disturbance comprises thruster momentum dumping.

15. A method as recited in claim 10 wherein the step of orienting comprises applying the disturbance counter to the first dynamic state and the second dynamic state.

16. A method as recited in claim 10 wherein orienting the spacecraft in a desired position in response to the disturbance comprises orienting the spacecraft in a desired position in response to the disturbance and controlling a biasing apparatus.

17. A method as recited in claim 10 wherein initiating the first dynamic state and initiating the second dynamic state comprises controlling a momentum wheel.

18. A method of dumping momentum in a spacecraft having a known sign, magnitude and time comprising:
commanding the spacecraft to move from a first position to an angular offset equal to an allowable transient angular excursion opposite in direction to a transient from the disturbance when torque is unloaded from a momentum wheel;
commanding a predetermined torque to unload the momentum wheel;
slewing the spacecraft to begin to reduce the angular offset in response to the predetermined torque;
commanding a thruster to apply an impulse to the wheel twice the size of that required to halt the slewing;
continuing to apply the predetermined torque from the momentum wheel until the slew is halted; and
slewing the spacecraft to the first position.

19. A method as recited in claim 18 wherein the predetermined torque comprises a full torque value.

20. A method as recited in claim 18 wherein commanding the spacecraft to move from a first position to an angular offset, commanding a predetermined torque to unload the wheel, slewing the spacecraft to begin to reduce the angular offset, continuing to apply the predetermined torque until the slew is halted, slewing the spacecraft to the first position have a time period associated therewith, said step of commanding a thruster to apply an impulse is centered within the time period.

21. A method as recited in claim 18 wherein during the step of commanding, suspending open loop control.

22. A method as recited in claim 18 wherein the step of continuing is performed for a predetermined time.

23. A method as recited in claim 18 wherein the step of continuing is performed until a predetermined position is reached.

24. A method as recited in claim 23 wherein the predetermined position is determined by a gyroscope.

25. A method as recited in claim 23 wherein the predetermined position is the allowable transient angular excursion.

26. A spacecraft comprising:
a momentum wheel;
a thruster; and
a controller coupled to the momentum wheel and the thruster, said controller controlling the momentum wheel to move the spacecraft from a first position to an angular offset equal to an allowable transient angular excursion opposite in direction to a transient from the disturbance when torque is unloaded from a momentum wheel, said controller commanding the application of a predetermined torque to unload the momentum wheel, said controller slewing the spacecraft to begin to reduce the angular offset in response to the predetermined torque, said controller commanding the thruster to apply an impulse to the spacecraft twice the size of that required to halt the slewing, said controller continuing to apply the predetermined torque to the momentum wheel until the slew is halted and controlling the momentum wheel to slewing the spacecraft to the first position.

27. A spacecraft as recited in claim 26 wherein the momentum wheel comprises a gimbaled momentum wheel, control momentum gyro or one or more of multiple reaction wheels.

28. A spacecraft as recited in claim 26 wherein the predetermined torque comprises a full torque value.

29. A spacecraft as recited in claim 26 wherein the controller commands slewing the spacecraft to the first position that has a time period associated therewith, said controller commanding a thruster to apply an impulse centered within the time period.

30. A spacecraft as recited in claim 26 wherein when the spacecraft controller commands a predetermined torque, said controller suspends open loop control.

31. A spacecraft as recited in claim 26 wherein the controller continues to command applying the impulse for a predetermined time.

32. A spacecraft as recited in claim 26 wherein the controller continues to command applying the impulse until a predetermined rate is reached.

33. A spacecraft as recited in claim 26 wherein the predetermined position is determined by a gyroscope.

* * * * *